Jan. 4, 1927.

A. C. HOPKINS 1,612,922

TIRE BEAD REENFORCING ELEMENT

Filed April 20, 1926

INVENTOR
Arthur C. Hopkins
BY Chappell & Earl
ATTORNEYS

Patented Jan. 4, 1927.

1,612,922

UNITED STATES PATENT OFFICE.

ARTHUR C. HOPKINS, OF NILES, MICHIGAN, ASSIGNOR TO NATIONAL STANDARD COMPANY, OF NILES, MICHIGAN.

TIRE-BEAD REENFORCING ELEMENT.

Application filed April 20, 1926. Serial No. 103,273.

The objects of this invention are:

First, to provide an improved reenforcing element for tire beads and the like which has great tensile strength relative to the strands entering into the same and is substantially non-extensible.

Second, to provide an improved reenforcing element which is capable of being manufactured by machinery at high speed.

Third, to provide an improved reenforcing element which may be manufactured by machines having few moving parts.

Objects pertaining to details and economies of my improvements will definitely appear from the detailed description to follow. The invention is clearly defined and pointed out in the claims.

Figure 1:
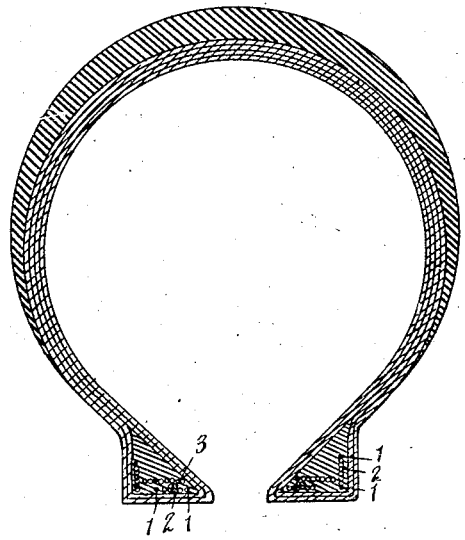
Figure 3:
Figure 4:
Figure 5:
Figure 2:
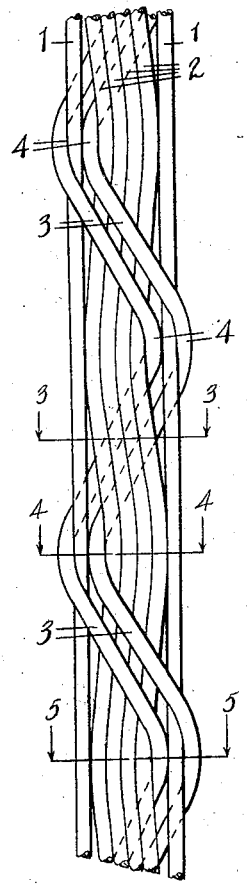

A structure embodying the features of the invention is clearly illustrated in the accompanying drawing forming a part of the application, in which:

Fig. 1 is a cross-section of a pneumatic tire having tire beads embodying my improved reenforcing elements embedded therein, Fig. 2 is a fragmentary view of my improved reenforcing element, Fig. 3 is a cross-section on a line corresponding to line 3—3 of Fig. 2, Fig. 4 is a cross-section on a line corresponding to line 4—4 of Fig. 2, and Fig. 5 is a cross-section on a line corresponding to line 5—5 of Fig. 2.

Referring to the drawing, the bonding strands in Figs. 1, 3, 4, and 5 are shown by heavier shading for convenience in illustration.

My improved reenforcing element comprises the marginal longitudinal strands 1, 1 and a plurality of intermediate longitudinal strands 2, there being four of the intermediate strands in the embodiment illustrated.

Each bonding strand 3 is successively looped around one of the marginal strands and the plurality or groups of intermediate strands. The bights 4 of the bonding strands are arranged to coincide and the reaches of the bonding strand loops are of substantial length and lie in superimposed contact with the strands which they cross.

The marginal strands 1 are substantially straight, the intermediate strands being deflected at the bights as shown in Fig. 2 and the deflection corresponding to the diameter of the bonding wire as the bonding and longitudinal strands lie in edge to edge contact in the transverse planes of the bights.

My improved reenforcing element has very great tensile strength and is substantially non-extensible either longitudinally or laterally and presents a very uniform surface. A further advantage is that the same may be very rapidly manufactured.

Having thus described my invention what I claim as new and desire to secure by Letters Patent is:

1. An element of the class described comprising marginal longitudinal wire strands, a plurality of intermediate longitudinal strands, and a pair of bonding strands, each bonding strand being successively looped around one of the marginal strands and the plurality of intermediate strands, the loops of the bonding strands being arranged to coincide, the longitudinal and bonding strands being in edge to edge contact in the planes of the bights of the loops.

2. An element of the class described comprising marginal longitudinal strands, a plurality of intermediate longitudinal strands, and bonding strands successively and alternately looped around one of the border strands and the intermediate strands, the bonding strands having coinciding loops, the reaches of the loops being of substantial length and in superimposed contact with the longitudinal strands embraced thereby.

3. An element of the class described comprising marginal longitudinal wire strands, a plurality of intermediate longitudinal strands disposed in side to side contact, and a pair of bonding strands, each bonding strand being successively looped around one of the marginal strands and the plurality of intermediate strands.

4. An element of the class described comprising border longitudinal strands, a plurality of intermediate longitudinal strands, and bonding strands successively and alternately looped around one of the border strands and the intermediate strands.

In witness whereof I have hereunto set my hand.

ARTHUR C. HOPKINS.